April 9, 1963 D. B. MAXSON 3,084,613
MACHINE FOR BREWING AND DISPENSING HOT BEVERAGES
Filed Aug. 10, 1959 4 Sheets-Sheet 1

INVENTOR.
DARWIN B. MAXSON
BY
Paul A. Weilein
ATTORNEY.

April 9, 1963 D. B. MAXSON 3,084,613
MACHINE FOR BREWING AND DISPENSING HOT BEVERAGES
Filed Aug. 10, 1959 4 Sheets-Sheet 2

INVENTOR.
DARWIN B. MAXSON
BY
Paul A. Weilein
ATTORNEY

United States Patent Office 3,084,613
Patented Apr. 9, 1963

3,084,613
MACHINE FOR BREWING AND DISPENSING
HOT BEVERAGES
Darwin B. Maxson, 7126 Rio Flora Place, Downey, Calif.
Filed Aug 10, 1959, Ser. No. 832,731
24 Claims. (Cl. 99—275)

This invention relates to apparatus for brewing and dispensing hot beverages such as coffee, tea and the like, made with powdered or other "instant" type beverage-making ingredients.

Machines of this type as heretofore made and operated, have not been entirely satisfactory as to the production of a hot beverage which has the desired characteristics as to appearance, aroma and flavor. Frequently, each cup or other portion of the beverage dispensed from such machines will have an unsightly foamy head thereon and lack the desired and expected aroma and flavor. Moreover, the strict sanitation regulations that have been set up in connection with public use of such machines, necessitate frequent cleaning of critical parts thereof and access to such parts in machines as heretofore made has presented a problem, in many cases requiring difficult and time-consuming dismantling of the machines.

It is an object of this invention to provide a machine such as described which is constructed, arranged and operated so that each dispensed cup or portion of the hot beverage will be free of the unsightly and objectionable foamy head such as heretofore produced with similar machines, and will have the desired and expected aroma and flavor.

Another object of this invention is to provide in a machine such as described a novel combination of a premixing chamber and a brewing unit wherein a beverage forming ingredient and hot water are fed into the premixing chamber at predetermined rates and discharged therefrom into the brewing unit at a rate and in a manner making it possible to effect the desired brewing action in the brewing unit, free of the objections above noted.

It is another object to provide in association with the aforesaid premixing chamber, novel means for preventing the outlet of the means for feeding dry powdered instant type coffee, tea or the like into the premixing chamber from being exposed to steam or moisture such as would tend to moisten the powder at the outlet and result in clogging of the latter.

A further object hereof is the provision in a machine such as described of a novel and highly efficient brewing unit which includes novel means for controlling the amount of a mixture of hot water and the beverage forming ingredient that is to be brewed at one time in a brewing compartment in the unit, as well as the rate and manner of feeding of this mixture to the brewing compartment, to the end that essentially one cup at a time is brewed and only a few, for example, three or four cups of the finished brew are maintained in storage for dispensing thereof.

A further object hereof is the provision of a machine such as described wherein the brewing unit is formed with a brewing compartment and a finished brew compartment communicated with one another in such a manner that no foam or unbrewed material will enter the finished brew compartment, the means affording communication between these compartments also being such that the flow of brew into the finished beverage compartment is restricted and thereby assures the desired duration of the brewing action in the brewing compartment to make the best possible finished brew.

It is another object of this invention to provide a novel form of brewing unit such as next above described which may be used to advantage in any hot beverage brewing and dispensing apparatus having means operable for feeding a mixture of water and powdered beverage ingredient into the aforesaid brewing unit, there being in this brewing unit a baffle member of novel form arranged to control the flow of the mixture into the brewing compartment of the unit and to distribute this flow in a manner which will preclude an undesirable boiling action which would occur if a solid stream of the mixture were fed at one spot into the brewing compartment, thereby assuring that a mild and uniform mixing and brewing action will take place in the brewing compartment and also preventing an uncontrolled flow of the mixture out of the brewing compartment before the mixture has been properly brewed.

It is another object of this invention to provide a machine of the character described in which a continuous flow or feed equilibrium of the ingredients is established upon actuation of the machine, thereby providing for dispensing of the finished beverage at the same rate that a new batch of the beverage is being brewed, there being provision for starting the operation of the machine by a push button control, the release of which stops the operation of the machine.

A further object is to provide a machine such as next above described which readily lends itself to use of automatic timing means to determine the period of continuous dispensing and brewing of the beverage.

It is a further object to provide in a machine such as described, novel safety overflow means which is constructed and arranged so that any malfunction of the valved dispensing unit would not cause the brewing tank to overflow into the other portions of the machine, this overflow means also making possible an emergency dispensing of the finished beverage in event of failure of the valve dispensing unit.

Another object of this invention is to provide in a machine such as described a novel arrangement of a water heating tank and the other elements of the machine whereby heat derived from the tank is utilized to keep warm and dry the container for the powdered beverage ingredient and the ingredient therein, and to maintain in a heated state those parts of the machine which it is desired to heat, also to cause flow of heated air through the machine for these purposes.

Another object is to provide a machine such as next above described in which the brewing tank is mounted in the water heating tank in such a manner as to assure the heating thereof and the parts therein to the desired temperature for maintaining the water at the desired temperature during the brewing process, also for maintaining the stored amount of finished brew at the desired temperature, all without the use of any source of heat other than that for the water heating tank.

A further object is to provide in a machine such as described a novel combination and arrangement of the premixing chamber, the brewing tank and the valved dispensing unit connected with the brewing tank, which makes it possible readily and easily to remove these elements as a unit for cleaning purposes, the construction of the premixing chamber, the brewing tank and the valved dispensing unit being such that each readily may be cleaned as to all parts thereof, reassembled and then readily replaced in the machine.

It is an additional object of this invention to provide novel means for varying the strength of the brew by varying the rate of feed of the beverage forming ingredient into the premixing chamber while maintaining a constant flow rate of the hot water.

It is another object of this invention to provide a machine such as described which constitutes an improvement in this art in point of compactness, simplicity of construction, reliability of operation and ease with which parts thereof may be removed, cleaned and replaced.

Other objects and advantages of the invention will be hereinafter described or will become apparent to those skilled in the art, and the novel features of the invention will be defined in the appended claims.

Referring to the drawings.

The embodiment of this invention shown in the accompanying drawings generally comprises a housing 1 in which are mounted a supply 2 of a beverage forming ingredient, for example, powdered instant coffee, a source 3 of water heated to a predetermined temperature, a premixing chamber 4 into which the coffee powder and hot water are fed at predetermined rates and wherein the brewing action commences, a brewing unit 5 into which flows the mixture from the chamber 4, and a valved dispensing unit 6 connected with the brewing unit 5 for drawing off the finished beverage.

Figure 4:
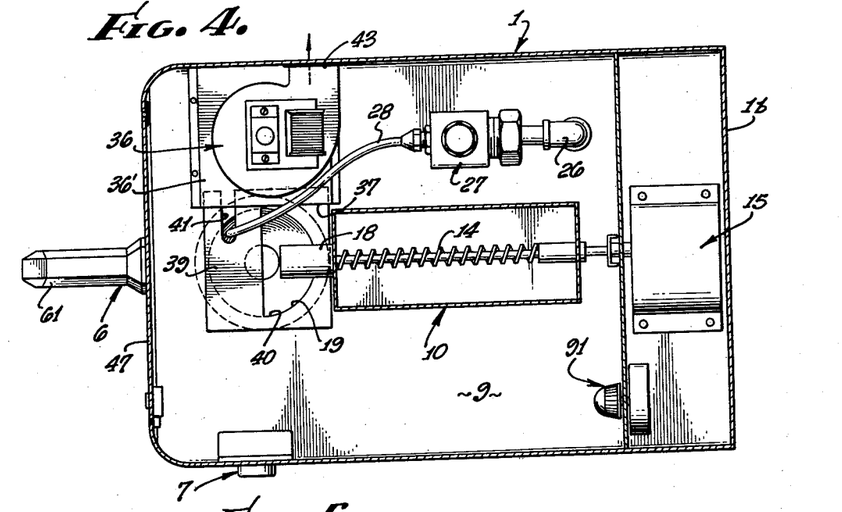
FIG. 4 is a sectional view taken on the line 4—4 of FIG. 2.

As will be hereinafter more fully described, electrically actuated means are operable in the housing 1 to start the operation of the machine incident to the manipulation of a control element such as the push button 7 located as shown in FIG. 4 on the exterior of the housing. When this push button is depressed and so held, the hot water will flow at a constant rate into the premixing chamber 4 while the coffee powder also feeds into this chamber at a predetermined rate, thereby initiating the brewing action. At the same time this feed and brewing action are started, the valved dispensing unit 6 is opened for discharging finished brew. Release of the push button stops the beverage dispensing operation of the machine as well as the feed of fresh ingredients to the premixing chamber 4.

The construction of the brewing unit 5 is such that while a brewing action is taking place therein, a controlled small amount of the brew will commence to be discharged through the then open dispensing unit 6. Accordingly, upon the initial operation of the machine, a receptacle such as a cup or other container should be held in position to receive the brew discharging through the dispensing unit 6. When the cup or container is filled or contains the amount of the brew desired, the operator releases the push button and thereby stops the machine. During the time the machine is in operation, flow rate of the brew from the brewing unit 5 through the dispensing unit 6, and the flow rate of the mixture delivered from the chamber 4 to the brewing unit 5 are such that when the operation of the machine is stopped, there will have accumulated in the brewing unit 5 a predetermined quantity of the finished brew, for example, an amount to fill three or four cups.

During each subsequent operation of the machine, a continuous flow equilibrium is established whereby the finished brew may be dispensed at substantially the same rate that a fresh brew is being processed in the tube 5.

Figures 1, 11:
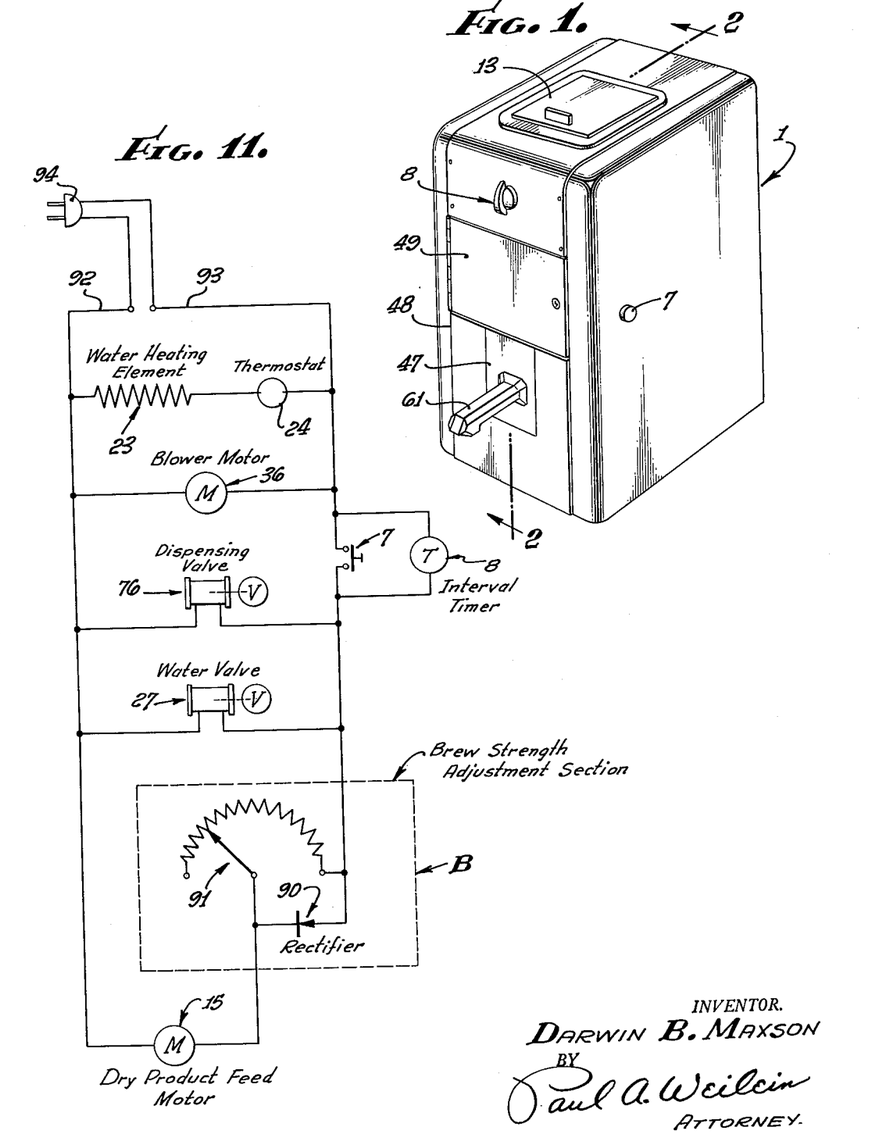
FIG. 1 is a perspective view of a brewing and dispensing machine embodying the present invention.
FIG. 11 is a diagrammatic view of the electrical circuit, control and operating units for the machine.

If desired, an automatic timing unit 8 may be connected in the system as shown in FIG. 11, and may be set to determine the duration of each operation of the machine, independently of the control afforded by the push button 7.

Figure 2:
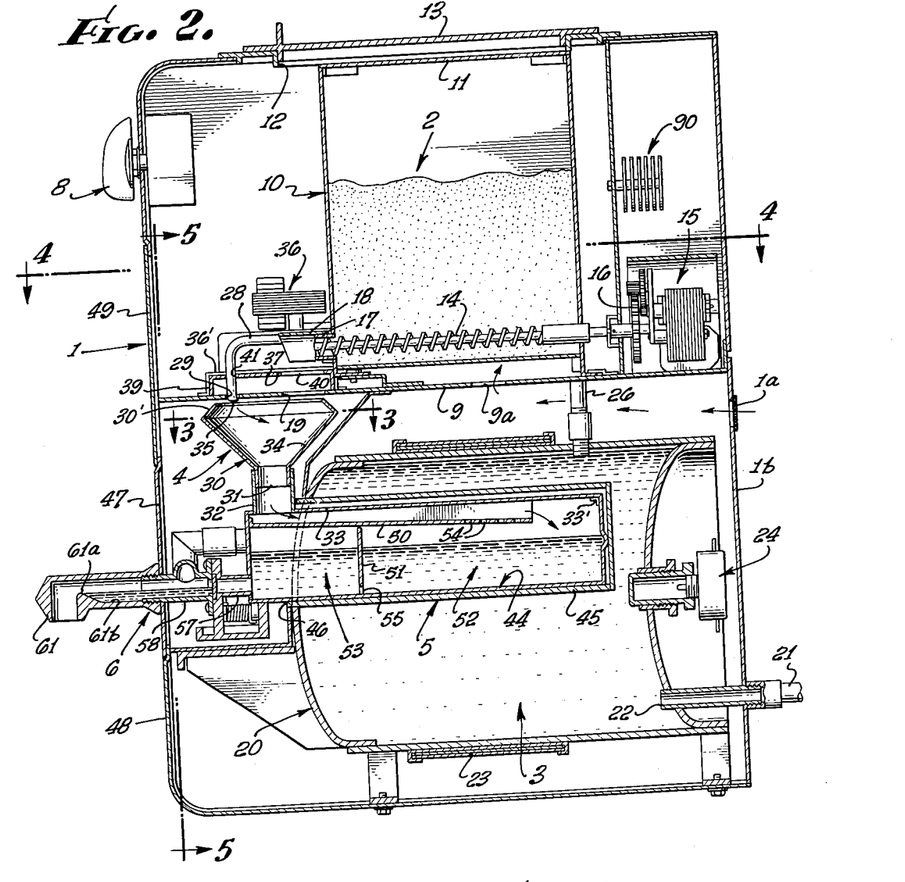
FIG. 2 is an enlarged vertical sectional view taken substantially on the line 2—2 of FIG. 1.
Figure 3:
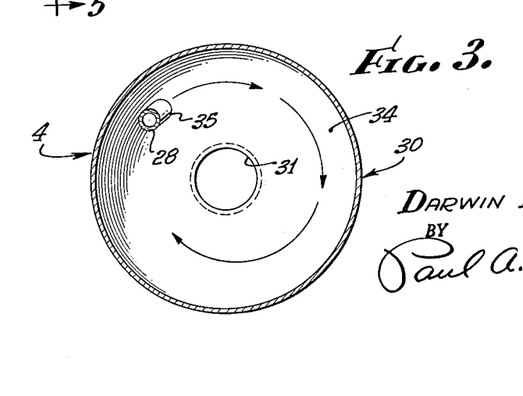
FIG. 3 is a sectional view taken on the line 3—3 of FIG. 2 on a somewhat enlarged scale.

With reference to FIG. 2, it will be seen that the housing 1 is provided with a horizontal parition 9 dividing the housing into upper and lower sections. The partition 9 has one or more openings 9a therein for air circulation between the lower section and the upper section. The housing 1 also has an air intake opening 1a in the rear wall 1b thereof. Supported in the upper section on the partition 9 is a container 10 for the supply 2 of the powdered beverage forming ingredient. This container has a removable closure 11 at its upper end and access thereto for filling or cleaning purposes is had through an opening 12 in the top of the housing, there being a removable closure 13 for the opening 12.

Any suitable feeding means for discharging the powdered material from the container 10 at a predetermined rate may be provided and as here shown, may include a screw feed member 14 driven by an electric motor 15 through suitable gearing 16. This motor is suitably supported on the partition 9 outside of the container 10. The screw feed member 14 is operable in the lower part of the container 10 so that the discharge end thereof is disposed in a tubular discharge spout 17 in one wall of the container. A hood or deflecting member 18 extends outwardly from and overlies the spout 17 to guide the powdered material as it leaves the spout and to aid in preventing moisture or steam from contacting the spout. The powdered material discharged from the spout 17 drops through a semicircular opening 19 in the partition 9 into the premixing chamber 4.

Means to be hereinafter described are provided to vary the rate of discharge of the powdered material into the chamber 4, this being accomplished, as here shown, by varying the speed of the motor 15.

The supply 3 of hot water is obtained from a heated tank 20 suitably mounted in the lower part of the housing 1. Water is supplied from a service line 21 into the tank through the inlet 22 of the latter.

Any suitable means may be employed for heating water in the tank and as here shown, comprises an electric heating element 23 surrounding the tank and controlled through a thermostatic switch unit 24, which latter serves to operate the element 23 to heat the water to the desired temperature and to maintain the water at the desired temperature. The heating element 23 and the heated tank 20 heat the air in the housing 1 and this heated air serves, as will be hereinafter noted, to heat other elements of the machine as may be desired.

A hot water discharge pipe 26 leads from the top of the tank 20 through the parition 9 to a solenoid-actuated control valve 27 mounted on the partition to one side of the container 10. A feed pipe 28 leading from the valve 27 extends through an opening 29 in the partition 9 so as to discharge hot water into the premixing chamber 4. The control valve 27 is set to discharge the water at a constant rate through the feed pipe 28 when the machine is operated responsive to manipulation of the push button 7 or the timing means 8.

The premixing chamber 4 is formed by means of a funnel-shaped hopper 30 supported at its restricted tubular discharge end 31 in a tubular inlet member 32 which is mounted on one end of the upper wall 33 of the brewing unit or tank 5.

The discharge spout 17 for the powdered material is disposed directly over and close to the mouth of the chamber 4 so that the powdered material will drop into this chamber against the conical wall 34 of the latter.

The water feed pipe 28 has its discharge end 35 disposed over the mouth of the chamber 4 and bent angularly so that the water will be discharged onto the conical wall 34 and swirl spirally therearound into contact with the powdered material and achieve the desired premixing of the materials as well as the start of the brewing action for forming the beverage.

The funnel-shaped hopper 30 has an upwardly and inwardly extended annular flange 30' at the mouth thereof to prevent water from swirling upwardly out of the chamber and to directionally control the upward flow of the moisture laden air and steam arising from the chamber 4 and brewing unit 5.

Figure 5:
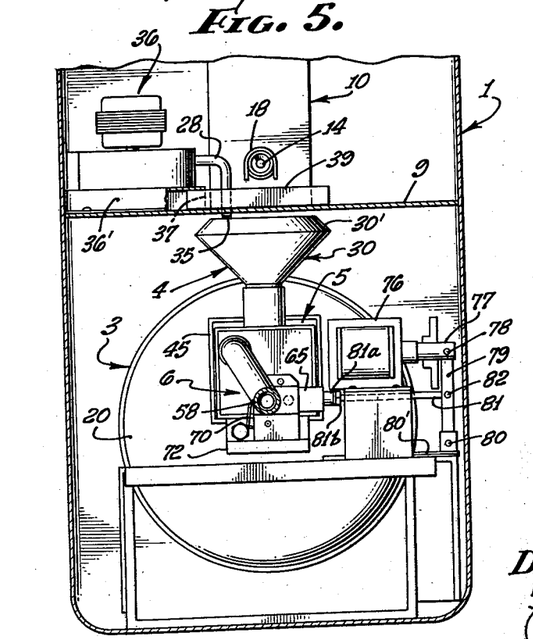
FIG. 5 is a fragmentary sectional view taken on the line 5—5 of FIG. 2.
Figure 6:
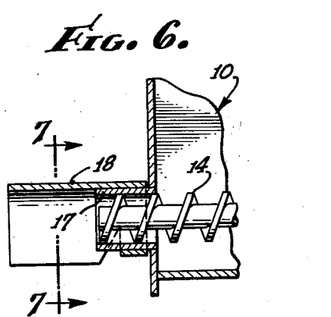
FIG. 6 is a fragmentary sectional view of the discharge spout for introducing the dry powdered ingredient, being shown on a larger scale than in FIG. 2.
Figure 7:
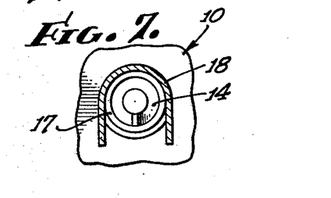
FIG. 7 is a sectional view taken on the line 7—7 of FIG. 6.

It is desired to prevent moisture laden air and steam arising from the chamber 4 from contacting the discharge spout 17 for the powdered material, and for this purpose a motor driven blower unit 36 is mounted on the partition 9 adjacent the semicircular opening 19 in the partition. The housing 36' of the blower has an intake opening 37 adjacent the opening 19. As shown in FIGS. 2, 4 and 5, a flanged baffle member 39 is supported by its flanges on the partition 19 and extends as shown in FIG. 4, into the housing 36' through the intake opening 37 above and parallel to the partition 9 shown in FIG. 2. The baffle 39 has a semicircular opening 40 which registers with the opening 19. The baffle 39 is also provided, as shown in FIG. 4, with a slot 41 which receives the water feed pipe 28 that passes through the opening 29 in the partition 19. The baffle 39 may be held in place by its frictional engagement as seen in FIG. 5 with the housing 36', but is removable for cleaning purposes.

Moisture laden air and steam arising from the mouth of the chamber 4, also warm air from within the housing 1 above the blower 36 and the spout 17 will be drawn in through the intake opening 37 of the blower and discharge through the outlet 43 of the blower as shown in FIG. 4. This will cause a circulation of the heated air in the housing 1 and will create a partial vacuum in the area adjacent the spout 17 and baffle 18, thereby preventing these parts from being dampened by moist air and steam to cause the powdered material at the spout to be preactivated in a manner that would cause clogging of the spout. This circulation of heated air will heat the container 10 and associated parts to maintain the powdered material in a dry state.

One of the important features of this machine is the construction, arrangement and mode of operation of the brewing unit 5. This unit includes, as here shown, an elongate brewing tank 44 mounted in a rectangular jacket 45 extending into the water tank 20 so that the brewing tank is heated uniformly by the hot water tank. The jacket 45 is closed on all sides and at one end, the other end 46 being open and extended through one end of the brewing tank 20 to permit of insertion and removal of the brewing tank 44 and parts connected thereto for cleaning purposes. One end of the tank 44 projects from the open end 46 of the jacket 45 and has the valve dispensing unit 6 connected therewith, the dispensing unit being extended through a removable section 47 of the front wall 48 of the housing 1. The removable section 47 is held in place by means of a hinged door 49 (see FIG. 1) forming a part of the wall 48. Upon opening of the door 49, the section 47 together with the brewing unit 5, premixing chamber 4 and the valved dispensing unit 6, may be removed as a unit for cleaning and thereafter readily replaced.

Figures 8, 9, 10:
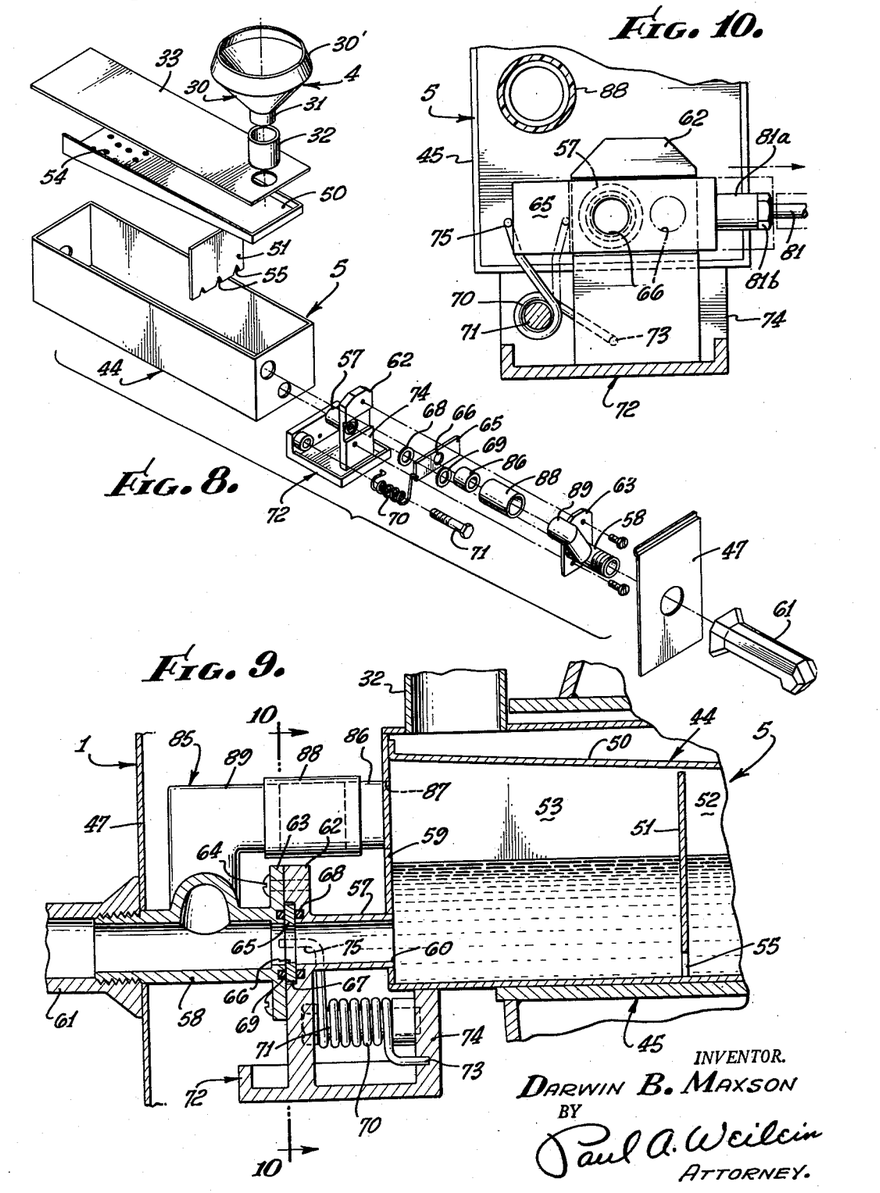
FIG. 8 is an exploded perspective view of the brewing tank and premixing chamber with the parts arranged as they would be assembled.
FIG. 9 is a fragmentary sectional view taken on a part of the plane of line 2—2 of FIG. 1 showing on a larger scale than in FIG. 2 the forward portion of the brewing unit and the valved dispensing mechanism for drawing off beverages from the unit.
FIG. 10 is a sectional view taken on the line 10—10 of FIG. 9, but showing the dispensing valve in closed position in dotted lines and in open position in full lines.

For the purpose of controlling the rate and manner of delivery of the mixture from the premixing chamber 4 into the brew tank 44, a baffle plate 50 which as shown in FIG. 8, is elongate and channel-shaped in cross section, is mounted in the tank 44 beneath and close to the removable upper wall or lid 33 of the brewing tank and extends for the greater portion of the length of this tank. The wall or lid 33 rests upon the side and end walls of the tank 44, there being depending positioning lugs 33' on the wall to hold the wall in place.

The mixture of water and powdered material discharging from the premixing chamber 4 is deposited upon one end of the baffle plate 50 and is conducted thereon into the tank 44. A vertical partition 51 in the tank 44 divides the tank into a brewing compartment 52 and a finished brew storage compartment 53. The partition 51 extends from the bottom of the tank into engagement with the underside of the baffle plate 50 as a support therefor. As the purpose of the baffle plate 50 is to control the rate and manner of introduction of the mixture into the brewing compartment 52, this plate is inclined so that the flow of mixture will be gradual toward the discharge end of the baffle plate located over the brewing compartment 52. Additional means are provided in connection with the baffle plate 50 to control the flow of mixture into the brewing compartment 52 and as here shown, includes a series of rows of small distribution openings 54 longitudinally and transversely spaced in the baffle plate 50. Portions of the mixture flowing along the baffle plate will drop through the openings 54, and other portions will drop from the lower end of the plate, all in a manner such that the mixture is uniformly distributed and drops in small amounts into the brewing compartment and, therefore, will prevent a violent boiling action which would occur if one or more solid and heavier streams of the mixture were deposited upon the surface of the liquid in this compartment, also prevent rapid feeding into the brewing compartment with consequent channelling or too rapid flow into the chamber 53 and out through the dispensing unit 6. These provisions make it possible to obtain the best possible brewing temperature and brewing action with a minimum of agitation and undesirable foam.

It is desired that the flow rate from the brew compartment 52 into the finished brew storage compartment 53 which latter is of much smaller capacity than the brewing compartment, be such that the rate of dispensing of finished brew will be substantially the same as the rate of making a fresh brew. Another reason for this controlled flow is to prevent the above noted channelling or rapid flow, also to prevent any foam developed in the brewing compartment or unbrewed materials from passing into the finished brew compartment 53. Means for these purposes are in the tank 44 and, as shown, may consist of a series of small orifices 55 formed in the lower portion of the partition 51, the orifices being larger at the lower sides thereof, for example, of an inverted V-shape as shown in FIG. 8. This will cause a controlled flow along the bottom wall of the tank 44 between the brewing compartment 52 and the finished brew storage compartment 53, and prevent any foam from entering the compartment 53 and at the same time restrict the flow into the compartment 53 for the purposes stated herein. The orifices 55 in being larger at the lower sides will permit any residual matter on the bottom wall of the tank to pass therethrough and thus will not tend to clog, while at the same time providing the desired flow restriction between the compartments 52 and 53.

It is important to emphasize that the capacity of the brewing tank 44 is such that but a small amount of the brew is stored therein, for example, an amount sufficient to fill about four cups. This provision avoids waste and provides for a most economical operation of the machine.

It is also important to emphasize that the flow rate from the brewing compartment 52 into the finished brew compartment 53 is such as to cause a prolonged contact of the powdered material with the hot water in the brewing tank. This assures that the foam will rise to the top of the liquid where it will remain until the air therein is released and the foam is dissolved and forms part of the liquid of the brew. The air released from the foam in the brewing compartment 52 escapes upwardly along the baffle 50 and out through the premixing chamber 4, thence to the atmosphere through the operation of the blower unit 36.

The valved dispensing unit 6 includes a sectional discharge pipe comprising sections 57 and 58 of which the section 57 is rigidly connected with the end wall 59 of the tank 44 so as to register with the discharge opening 60 in the wall 59. The pipe section 58 extends from the joint thereof with the section 57 through the removable section 47 of the front wall of the housing and is threadedly coupled to a discharge spout 61.

Valve means for controlling the flow of the finished beverage through the pipe sections 57 and 58 is provided at the joint of these pipes where abutting flanges 62 and 63 on the pipes are secured to one another by fastenings 64. The valve means includes a slide valve 65 operable between the flanges 62 and 63 to position an opening 66 in the valve member into and out of registration with the passage through the pipes 57 and 58. The flange 62 is provided with a recess 67 to slidably accommodate the slide valve 65, there being O-ring seals 68 and 69 carried by the flanges 62 and 63, respectively, to seal against the slide valve and prevent leakage at the joint and around the valve member.

Spring means are provided for holding the slide valve 65 in a closed position and as here shown, comprises a coiled spring 70 mounted on a pin 71 supported in a bracket 72, here shown as integral with the flange 62. An end 73 of the spring 70 is held stationary against a portion 74 of the bracket 72, whereas the other end 75 of the spring is engaged with an end of the slide valve 65 to urge the valve to a closed position.

Means are provided for opening the slide valve 65 incident to actuation of the machine to start a brewing operation, and as shown in FIG. 5, includes a solenoid 76 suitably mounted in the housing 1 with its armature 77 pivotally connected as at 78 to a lever 79 fulcrumed as at 80 on a support 80'. A push rod 81 is pivoted as at 82 at one end to the lever 79 and has its other end disposed to abut an end of the slide valve 65. An axially adjustable head 81a is provided on the rod 81 to abut the valve 65, being held in adjusted position by the nut 81b. Upon energization of the solenoid 76, it will be seen that the head 81a on the rod 81 will abut the valve 65 and move it from the closed position (dotted lines in FIG. 10) to the open position (full lines in FIG. 10) to permit of dispensing of finished beverage from the compartment 53. When the solenoid is de-energized, the spring 70 will return the slide valve 65 and its actuating means to the position in which the valve is closed. The use of the push rod 81 makes it possible to remove and replace as a unit, the chamber 4, the tank 44 and the valved dispensing means 6 for cleaning purposes, the solenoid and parts connected thereto remaining in place in the housing.

Overflow means here shown as including an angular sectional pipe 85 operatively associated with the brewing tank 44 and the valve dispensing unit 6, is provided to prevent overflow of liquid from the tank 44 into other parts of the machine in the event of malfunctioning of the dispensing unit. This overflow means also affords circulation of air between the brewing tank and the atmosphere. The pipe 85 includes a short section 86 coupled to an opening 87 in the upper part of the front wall of the tank 44. A tubular connecting member 88 joins the pipe section 86 to an L-shaped section 89 which is integral with the pipe section 58 so that any liquid overflowing from the tank 44 will pass through the opening 87, pipe sections 86, 88, and 89, the pipe section 58 and the spout 61. With this arrangement, it will be seen that air may flow up through the nozzle 61, pipe section 58 and overflow pipe sections 89, 88 and 86 into the tank 44.

Means are provided to lubricate the slide valve 65, and as shown in FIG. 2, consist of a formation of the bore of the spout 61 which will trap a small amount of liquid along the bottom of the spout and the bottom of the pipe section 58, up to the slide valve 65. As here shown, the bottom of the spout is inclined downwardly from an enlargement 61a in the spout bore, thereby forming a shallow depression 61b leading up to the valve 65 to trap a small amount of the liquid flowing through the dispensing unit 6 so that the valve will be kept wet by such trapped liquid.

Brew strength adjusting means is provided, and as here shown, includes a rectifier unit 90 (see FIGS. 2 and 11) and a rheostat 91. The rheostat is located, as shown in FIG. 4, in the upper part of the housing 1, and access thereto for adjustment thereof may be had by removing the cover 13 on top of the housing. As will be hereinafter described, adjustment of the rheostat will provide for regulation for the speed of the motor 15 for the feed screw 14 whereby the rate of feed of the powdered material through the discharge spout 17 may be varied as desired to control the strength of the brew.

Referring now to FIG. 11, it will be seen that the various electrically operated elements and controls of the machine are connected in an electrical circuit including main conductors 92 and 93 leading from a plug 94 to the various elements and controls, electrical power being supplied when the plug 94 is mounted in a suitable outlet (not shown) connected with a source of alternating electrical current.

The water heating element 23 and the thermostat unit 24, also the motor of the blower unit 36 are coupled in parallel with the main conductors 92 and 93 so that upon energization of the conductors 92 and 93, the water heating element and blower unit are continuously operated.

The solenoid unit 76 for the dispensing valve 65, the solenoid controlled water feed valve 27 and the motor 15 for the means for feeding the powdered material through the spout 17, are also connected in parallel with the main conductors 92 and 93, but are controlled by the push button 7 so that the circuits therefor are closed only when the button is depressed and so held. Release of the button will de-energize the units 76, 27 and 15. The automatic timer 8 may be connected in the circuit for the water feed valve 27, the solenoid 76 for the dispensing valve 65 and the motor 15 for controlling the feed of powdered material, as shown in FIG. 11. This timer may be set to determine the duration of the dispensing and brewing operation, thereby making control by the push button 7 unnecessary.

A brew strength adjustment section of the circuit shown in FIG. 11 is generally designated B and includes the rectifier 90 and the rheostat 91 both coupled in the main conductor 93 so that the motor 15 will be operated by direct current. The rheostat 91 is used to split the alternating current and direct it to the rectifier 90 so that the motor 15 will be operated on direct current. The setting of the rheostat determines the speed of the motor and, therefore, the rate of feed of the powdered material through the spout 17. With this method of control a nearly constant output torque is maintained with provision for a wide range of motor speeds so that the rate of feed of the dry material may be controlled with a nicety, assuring the desired brew strength.

It should be noted that although the term "premixing chamber" has been used to describe the funnel shaped member 40, a partial brewing action will take place in this chamber when the heated water contacts the powdered ingredient therein. In fact, this brewing action is continued as the flow of the mixture takes place along the baffle plate 50, as well as in the brewing compartment 52, also in the finished beverage compartment 53. However, the main brewing action takes place in the larger brewing compartment 52 and when the brew reaches the finished beverage compartment 53, it is free of foam and ready for dispensing as a finished product.

While specific structural details have been shown and described, it should be understood that changes and alterations may be resorted to without departing from the spirit of the invention as defined in the appended claims.

I claim:

1. In a machine for brewing and dispensing a hot beverage having means for mixing a beverage ingredient and hot water: that improvement which includes a brewing tank having a pair of compartments therein; means for directing the mixture of said ingredient and said hot water into said tank; said directing means including a member providing an elongate surface disposed in said tank to control the flow of said mixture thereover into one of said compartments; means between said compartments for effecting a subsurface flow from said one compartment to the other compartment; and dispensing means connected with said other compartment for drawing off the brew therefrom.

2. In a machine for brewing and dispensing a hot beverage having means for mixing a beverage ingredient and hot water: that improvement which includes a brewing tank having a brewing compartment; means for directing the mixture of said ingredient and said hot water into said tank; said directing means including a member providing an elongate surface in said tank inclined toward the bottom of said tank and disposed to control the flow thereover into said brewing compartment; dispensing means connected with said tank for drawing off the brew therefrom; and means in said tank for causing a subsurface flow of brew from said compartment to said dispensing means.

3. In a machine for brewing and dispensing a hot beverage having means for mixing a beverage ingredient and hot water: that improvement which includes a brewing tank having a pair of compartments; baffle means in said tank overlying both of said compartments; means for conducting the mixture of said ingredient and said hot water onto said baffle means; means embodied in said baffle means for causing a restricted flow of the mixture into one of said compartments; dispensing means connected with said other compartment; and means in said tank for causing a subsurface flow of brew from said other compartment to said dispensing means.

4. In a machine for brewing and dispensing a hot beverage having means for mixing a beverage ingredient and hot water: that improvement which includes a brewing tank having a bottom wall; a pair of compartments over said bottom wall; baffle means overlying both of said compartments; means for depositing the mixture of said ingredient and hot water onto said baffle means; means embodied in said baffle means for causing the mixture to gravitate therefrom into but one of said compartments at a plurality of spaced points therein; dispensing means operable for discharging the brew from said tank; and means in said tank located adjacent said bottom wall for directing a restricted flow of the brew along said bottom wall of the tank between said compartments and to said dispensing means.

5. In a machine for brewing and dispensing a hot beverage having means for mixing a beverage ingredient and hot water: that improvement which includes a brewing tank having a brewing compartment and a finished brew compartment; means for directing the mixture of said ingredient and said hot water into said tank at a point over said finished brew compartment; means in said tank providing a surface inclined toward said brewing compartment for causing portions of said mixture entering said tank to gravitate at spaced points thereon into said brewing compartment; means permitting flow of the brew between said compartments; and dispensing means for drawing off brew from said finished brew compartment.

6. In a machine for brewing and dispensing a hot beverage having means for mixing a beverage ingredient and hot water: that improvement which includes a brewing tank having a brewing compartment and a finished brew compartment; means for directing the mixture of said ingredient and said hot water into said tank; means in said tank providing an inclined surface onto which said mixture is deposited from said directing means and on which said mixture is conducted into said brewing compartment; a partition between said compartments; said partition having openings adjacent the bottom of said compartments providing for a subsurface flow of brew from said brewing compartment into said finished brew compartment; and dispensing means for drawing off brew from said finished brew compartment.

7. In a machine for brewing and dispensing a hot beverage having means for mixing a beverage ingredient and hot water: that improvement which includes a brewing tank having a brewing compartment; means for directing the mixture of said ingredient and said hot water into said tank; a baffle plate mounted in said tank over said compartment to receive said mixture; said baffle plate being inclined from said directing means toward said brewing compartment and having a series of orifices spaced one from the other along said baffle plate for causing portions of the mixture to gravitate therethrough into said brewing compartment; and dispensing means connected with said tank.

8. In a machine for brewing and dispensing a hot beverage having means for mixing a beverage ingredient and hot water: that improvement which includes a brewing tank having a brewing compartment; means for directing the mixture of said ingredient and said hot water into said tank; a baffle plate mounted in said tank over said compartment to receive said mixture; said baffle plate having a series of orifices spaced one from the other along said baffle plate for causing portions of the mixture to gravitate therethrough into said brewing compartment; dispensing means connected with said tank; and means including a partition in said tank having openings in the lower edge thereof for causing flow of brew along the bottom of said tank from said brewing compartment to said dispensing means.

9. In a machine for brewing and dispensing a hot beverage having means for mixing a powdered beverage ingredient and hot water: that improvement which includes a brewing tank having a brewing compartment and a finished brew compartment; a baffle plate in said tank with one end portion disposed in position over said finished brew compartment; means for causing said ingredient and said hot water to flow onto said end portion of said plate; the other end portion of said plate being disposed over said brewing cmpartment; said plate being inclined toward said brewing compartment; openings in only that portion in said plate overlying a portion of said brewing compartment for causing portions of the mixture to gravitate in small quantities into said brewing compartment; means in said tank disposed between said plate and the bottom of the tank for causing a subsurface flow of brew from said brewing compartment into said finished brew compartment; and dispensing means connected with said finished brew compartment operable for drawing off brew therefrom.

10. In a machine for brewing and dispensing a hot beverage having means for mixing a powdered beverage ingredient and hot water: that improvement which includes a brewing unit removably mounted in the machine; said unit including a tank having a brewing compartment and a finished brew compartment; said brewing compartment being of greater capacity than said finished brew compartment; a baffle plate mounted in said tank so as to extend over both of said compartments; said plate being inclined toward and disposed for the most part over said brewing compartment; means for directing the mixture of said ingredient and said hot water onto said plate; said plate having a plurality of orifices longitudinally and transversely spaced in the portion thereof over said brewing compartment for discharging the mixture into said brewing compartment; means in said tank below said plate for effecting a restricted subsurface flow of brew from said brewing compartment into said finished brew compartment; and dispensing means operable for drawing off brew from said finished brew compartment.

11. In a machine for brewing and dispensing a hot beverage having means for mixing a beverage ingredient and hot water: that improvement which includes a brewing tank having a brewing compartment and a finished brew compartment; a baffle plate of channel shape in cross section mounted in said tank for receiving the mixture of said ingredient and hot water and effecting flow of said mixture into said brewing compartment; a partition extending between said baffle plate and the bottom of said tank; said partition having an opening for causing a subsurface flow of brew from said brewing compartment past said partition into said finished brew compartment; and dispensing means connected with said finished brew compartment.

12. In a machine for brewing and dispensing a hot beverage; means for mixing a beverage ingredient and hot water; a brewing tank having a brewing compartment and a finished brew compartment; a member in said tank providing a surface disposed to receive said mixture and discharge said mixture into said brewing compartment; a partition disposed between said member and the bottom of said tank and separating said compartments; said partition having openings therein at the bottom of said tank for conducting brew from said brewing compartment into said finished brew compartment; and dispensing means connected with said finished brew compartment.

13. In a machine for brewing and dispensing a hot beverage; a mixing chamber for mixing therein a powdered ingredient and hot water; means for feeding said ingredient and said hot water to said chamber; said chamber having an outlet; an elongate brewing tank having a removable top wall provided with an opening for conducting said mixture from the outlet of said chamber into said tank; a partition dividing said tank into a brewing compartment and a finished brew compartment; an elongate baffle plate mounted in said tank between said top wall and said partition with one end portion disposed to receive the mixture entering through said opening in said top wall; said plate being inclined from said one end portion toward said brewing compartment for discharging said mixture into said brewing compartment; said partition having a series of openings therein disposed to cause a flow of brew along the bottom of said tank through said openings from said brewing compartment into said finished brew compartment; and dispensing means connected with said finished brew compartment.

14. In a machine for brewing and dispensing a hot beverage; a mixing chamber for mixing therein a powdered ingredient and hot water while said ingredient and said water gravitate through said chamber; a tank; a partition dividing said tank into a brewing compartment and a finished brew compartment; dispensing means connected with said finished brew compartment; means for conducting said mixture from said mixing chamber into said tank; and an elongate baffle plate disposed in said tank over said compartments to receive said mixture from said conducting means; said plate being inclined toward said brewing compartment and having orifices spaced longitudinally and transversely therein through which amounts of said mixture are directed into said brewing compartment; said partition having openings therein disposed to cause flow along the bottom of the tank from the brewing compartment into said finished brew compartment.

15. In a machine for brewing and dispensing a hot beverage having a supply of a powdered ingredient, a hot water tank, heating means associated with the tank, and means operatively connected with said supply and said tank for feeding therefrom so as to flow together and become mixed, amounts of said ingredient and hot water: the improvement which includes a brewing tank; a jacket extending into said hot water tank and having an open end; said brewing tank being slidable through said open end into said jacket so as to be heated therein; one end of said brewing tank projecting outwardly through said open end of said jacket; means for conducting the mixture of said ingredient and hot water into said brewing tank; and dispensing means connected with said one end of said brewing tank.

16. In a machine for brewing and dispensing a hot beverage having a supply of a powdered ingredient and, a hot water tank, heating means associated with the tank, and means operatively connected with said supply and said tank for feeding therefrom so as to flow together and become mixed, amounts of said ingredient and hot water: the improvement which includes means providing in said tank a heating chamber open at one end through a wall of said tank; a brewing tank removably mounted in said chamber; said brewing tank having one end extending outwardly from said open end of said heating chamber; means for conducting the mixture of said ingredient and said water into said brewing tank; and dispensing means connected with said one end of said brewing tank.

17. In a machine for brewing and dispensing a hot beverage having a housing for containing a supply of a powdered ingredient; said housing having an opening in a wall thereof, said housing also enclosing a hot water tank, water heating means associated with the tank, and means for feeding so as to flow together and become mixed, amounts of said ingredient and hot water: the improvement which includes means providing in said tank so as to be heated thereby, a chamber open at one end through a wall of the tank; a brewing tank removably mounted in said chamber with one end projecting outwardly through said open end of said chamber; means on said one end of said brewing tank for conducting the mixture of said ingredient and hot water into said brewing tank; dispensing means connected with said one end of said brewing tank; said brewing tank and said dispensing means being opposite said opening in said wall of said housing and removable as a unit through said opening in said wall of said housing; and closure means for said opening in said wall of said housing.

18. In a machine for brewing and dispensing a hot beverage: a housing for enclosing means for containing a supply of a powdered ingredient; a hot water tank beneath said means for containing a supply of powdered ingredient; heating means for said tank; a mixing chamber; means for feeding said ingredient into said chamber including a discharge spout from which said ingredient gravitates into said chamber; means for feeding hot water from said tank into said chamber so as to mix with said ingredient therein; exhaust means having an intake opening disposed adjacent said chamber and below said spout; said exhaust means having an outlet through a wall of said housing; operation of said exhaust means causing heated air from the housing above said spout to be drawn past the spout and through said intake, also causing moist air and steam arising from said mixing chamber to be drawn into said intake without contacting said spout; said mixing chamber having an outlet through which the mixture gravitates; a heating chamber in said hot water tank having one end open in a wall of the tank; a brewing tank mounted in said heating chamber with one end extending outwardly from said open end of said heating chamber and supporting thereon said mixing chamber; said brewing tank having an inlet for receiving the mixture from said outlet of said mixing chamber; and dispensing means connected with said one end of said brewing tank.

19. A machine for brewing and dispensing a hot beverage including: means for brewing the beverage; dispensing means operable for drawing off the brew from said brewing means; valve means in said dispensing means; said dispensing means including a conduit leading from said valve means; means for operating said valve means; and said conduit having a pocket therein extending to said valve means for retaining therein in contact with said valve means a portion of the brew that has entered said conduit following an opening of said valve means as a lubricant therefor.

20. A machine for brewing and dispensing a hot beverage including: means for brewing the beverage including a tank having a pair of compartments; means for conducting a beverage forming mixture into one of said compartments; means for effecting a subsurface flow between said compartments; dispensing means operable for drawing off the brew from the other compartment; valve means in said dispensing means; means for operating said valve means; overflow means connected with said other compartment and said dispensing means so as to by-pass said valve means, arranged whereby the brew may be dispensed through the dispensing means in the event of malfunction of said valve means.

21. A brewing and dispensing unit for use in a machine for brewing and dispensing a hot beverage and wherein the machine has a housing in which are enclosed a hot water tank and provision for simultaneously feeding amounts of a powdered ingredient and hot water for admixture thereof; said brewing and dispensing unit including a brewing tank; means in said hot water tank for removably supporting therein said brewing tank; a mixing chamber carried on said brewing tank and arranged to receive said hot water and said ingredient and discharge the mixture thereof into the brewing tank; and dispensing means connected with said brewing tank; said housing having an opening in a wall thereof; closure means for said opening; said brewing tank, said mixing chamber and dispensing means being constructed and arranged to be removed and replaced as a unit through said opening in said wall of said housing.

22. A machine for brewing and dispensing a hot beverage comprising: a housing; a brewing tank mounted in said housing for removal therefrom; means in said housing for feeding into said tank amounts of a powdered beverage ingredient and hot water; dispensing means connected with said tank; a valve in said dispensing means for controlling the flow of brew through said dispensing means; means in said housing for operating said valve; said valve being removably associated with said operating means; said housing having an opening in a wall thereof through which said tank, dispensing means and valve are removable and replaceable as a unit; and closure means for said opening.

23. A machine for brewing and dispensing a hot beverage comprising: a housing; a brewing tank mounted in said housing for removal therefrom; means in said housing connected with said tank for feeding into said tank an amount of a powdered beverage ingredient and hot water; dispensing means connected with said tank; a valve in said dispensing means for controlling flow of the brew therethrough; operating means for said valve mounted in said housing; said valve being removable from said operating means; said housing having an opening in a wall thereof opposite said feeding means and said tank; said feeding means, tank, dispensing means and valve being removable and replaceable as a unit through said opening in said housing; a closure means for said opening.

24. A machine for mixing and dispensing a hot beverage comprising: a brewing tank; partition means forming compartments in said tank and providing means for confining flow between said compartments along the bottom of said tank; one of said compartments having an outlet for discharging the brew from the tank; a mixing chamber operable to mix therein and gravitationally discharge therefrom a beverage ingredient and hot water; means for feeding said ingredient and hot water into said mixing chamber; means interposed between said mixing chamber and said tank for conducting the mixture from said chamber into said tank; and means in said tank beneath said conducting means providing a surface for receiving said mixture from said conducting means and directing said mixture thereon into the compartment of said tank farthest removed from said outlet.

References Cited in the file of this patent

UNITED STATES PATENTS

| | | |
|---|---|---|
| 672,006 | Norkewitz | Apr. 6, 1901 |
| 1,177,621 | Hauk | Apr. 4, 1916 |
| 1,204,078 | Skidd | Nov. 7, 1916 |
| 1,453,109 | Hathaway | Apr. 24, 1923 |
| 1,470,584 | Kreutz | Oct. 9, 1923 |
| 2,016,281 | Harper | Oct. 8, 1935 |
| 2,098,663 | Juhasz | Nov. 9, 1937 |
| 2,527,115 | Bosworth | Oct. 24, 1950 |
| 2,570,375 | Pritchard | Oct. 9, 1951 |
| 2,719,304 | Schultz | Oct. 4, 1955 |
| 2,800,152 | Sloier | July 23, 1957 |
| 2,827,845 | Richeson | Mar. 25, 1958 |
| 2,838,077 | Cooper | June 10, 1958 |
| 2,860,809 | Perry | Nov. 18, 1958 |
| 2,912,143 | Woolfolk | Nov. 10, 1959 |